Figure 1:
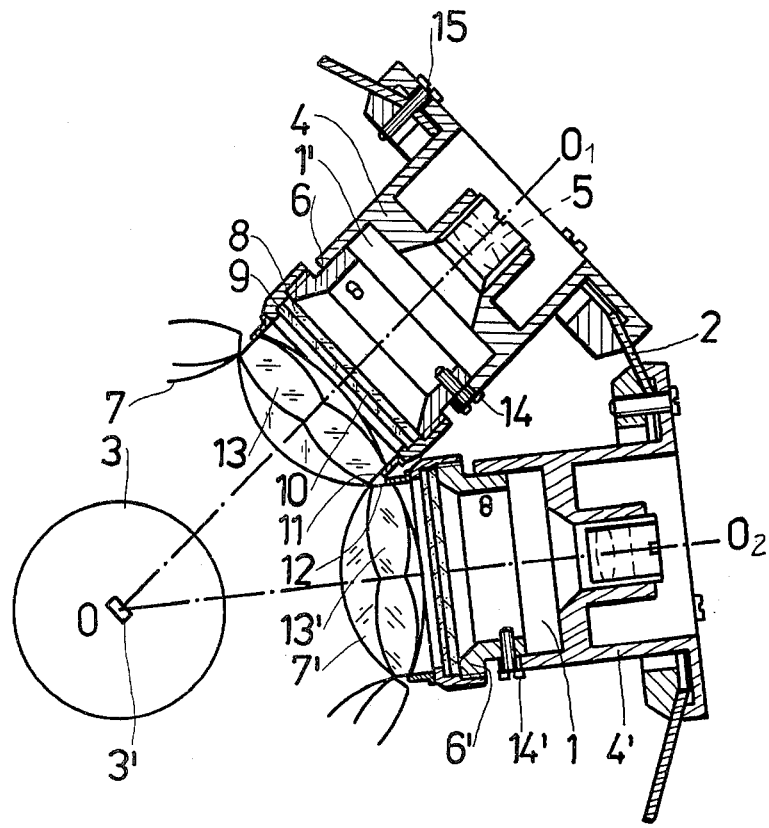

United States Patent [19]

Meier

[11] 4,403,964
[45] Sep. 13, 1983

[54] STAR PROJECTORS FOR PLANETARIA

[75] Inventor: Ludwig Meier, Jena, German Democratic Rep.

[73] Assignee: Jenoptik Jena G.m.b.H., Jena, German Democratic Rep.

[21] Appl. No.: 308,902

[22] Filed: Oct. 20, 1981

[30] Foreign Application Priority Data

Dec. 1, 1980 [DD] German Democratic Rep. ... 225598

[51] Int. Cl.$^3$ ............................................. G09B 27/00
[52] U.S. Cl. ...................................... 434/286; 353/62
[58] Field of Search ....................... 434/286, 284, 285; 353/62

[56] References Cited

U.S. PATENT DOCUMENTS

| 1,693,969 | 12/1928 | Villiger et al. | 434/286 |
| 2,168,799 | 8/1939 | Korkosz et al. | 434/286 |
| 2,483,216 | 9/1949 | Marshall | 434/286 |
| 3,470,629 | 10/1969 | Kittredge et al. | 434/286 |
| 3,707,786 | 1/1973 | Clark | 434/286 |

FOREIGN PATENT DOCUMENTS 430269  8/1967  Switzerland .

OTHER PUBLICATIONS

"Das Zeiss Planetarium," pp. 26–28, Gustav Fischer Press, 1953.
"Die Sterne Dürfet Ihrverschwenden," pp. 54–56, Gustav Fischer Press, 1953.
"Bild der Wissenschaft" Deutsche Verlaganstalt, pp. 116–118, 1977.
"Himmelsuhrwerk Planetarium," pp. 107–114, Keller, 1977.
Jena Review, vol. 6, pp. 346–347, 1968.

Primary Examiner—William H. Grieb

[57] ABSTRACT

The invention relates to a projection device for star projections in planetaria in which a plurality of star projectors are provided in the wall of a substantially spherical housing in the center of which a light source is arranged. The projector mounts and/or the condenser lenses of the projectors preferably are polyhedrons. The sides of the polygonal condenser lenses have bevel edges via which they are contacting neighboring condenser, lens sides so that substantially no light losses are involved.

2 Claims, 2 Drawing Figures

STAR PROJECTORS FOR PLANETARIA

The invention relates to an improved projection device for projecting stars in planetaria, in particular to the arrangement of the projection optical system for fixed star projectors.

It is known to project the fixed stars onto a semispherical screen, namely, a planetaria dome by a plurality of individual projectors arranged about a sphere or upon a polyhedron, as described by Letsch "Das Zeiss Planetarium" VEB Gustav Fischer Press, Jena, 1953, pages 26 to 28, by Werner "Die Sterne dürfet ihr verschwenden" Gustav Fischer press, Stuttgart, 1953, pages 54 to 56, and The Jena Review 1968, Vol. 6, pages 346 to 347.

A high-power light source is arranged in the interiour of the sphere or polyhedron.

The condenser lenses of the projectors are brought as near as feasible to the light source to have a favorable exploitation of the light and an optimum brightness.

A maximal approximation of the condenser lenses to the light source is, however, technologically limited, namely by the size of the rotation symmetrical condenser lenses and their mounts, so that with a given light source and a required size of the image the brightness obtainable is determined. This disadvantage is at least partially obviated by increasing the power of the light source and thus the brightness for the fixed stars' projectors which, however, does also increase the temperature.

Furthermore, gas discharge lamps are used to increase the brightness in planetarium projectors, as described in "Bild der Wissenschaft" Special print 1977, Deutsche Verlagsanstalt Stuttgart.

It becomes obvious from the latest firm publication by Spitz (US, Goto (Japan, Zeiss/Opton BRD that the disadvantages involved when using rotation symmetrical condenser lenses for fixed star projections are not yet overcome.

The Swiss Pat. No. 430269 discloses a solution in which a plurality of condensers is arranged about the light source to exploit the entire light emitted from the light source in order to illuminate one image window. The light is conducted to the image window via light cables. The use of light cables, however, in planetaria is disadvantageous since a great number of star images have to be illuminated so that a plurality of projectors have to be supplied by one light source. This involve considerable expenditures.

It is an object of the present invention to obviate the above disadvantages.

It is a further object of the invention to provide a simple and effective constructional solution which permits a considerable brightness increase in illuminating fixed stars' projectors.

These and other objects are realised by a projection device for projecting stars in a planetarium, where a plurality of projectors is arranged about a sphere or a polyhedron in the interior of which a central light source is provided.

The mount of the projectors and for the condenser lenses are of polygonal cross-section which corresponds to the respective polyhedron.

Advantageously peripheral areas of the condenser lenses are also of polyhedral shape, the respective edges opposite to the light source of the individual condenser lenses substantially contact the edges of the neighbouring ones.

It is a further advantage when the condenser lenses are mounted via their peripheral areas.

By virtue of the inventional arrangement a brightness increase is obtained by three ways:

The spaces between the condenser lenses are reduced. The increase of the illumination power at the star foil due to approaching the condenser lenses to the light source, which becomes feasible to the reduced size of the condenser lenses, and, last not least, the distance between the light source and the projector objective is maintained so that the focal length of the objective is increased and, hence, the size of the holes in the foil which represent the stars can be enlarged, the projection images of the respective stars on the planetarium dome being maintained.

In order that the invention may be more readily understood reference is made to the accompanying drawings which illustrate diagrammatically and by way of example one embodiment thereof and where FIG. 1 is a schematical view of a projector arrangement.

Figure 2:
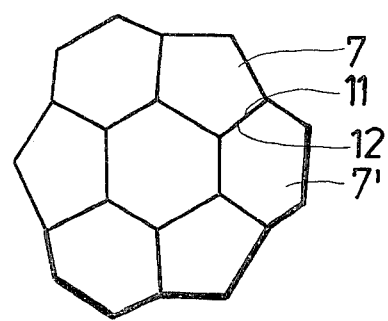

FIG. 2 is another view of the projector arrangement considered from the light source.

In FIG. 1 the projection arrangement for simulating stars in planetaria comprises a light source 3 with a coil 3' for emitting projection light beams only two of which are indicated by the dash-point lines $0-0_1$ and $0-0_2$.

The light source 3 is positioned in the center of a spherical housing 2 which can be a sphere or a polyhedron the surface of which is provided with a number of holes for inserting projectors 1, 1' thereinto.

The projectors 1, 1' have mounts 4, 4' respectively which are secured to the housing surface 2 by screws 15.

Objectives 5, 5' are arranged in mounts 4, 4' into which mounts 6, 6' are inserted. The mount 6, 6' support condenser lenses 7 and 7', respectively, and are adjustable relative to the mount 4, 4' by screws 14 and 14'.

The condenser lenses 7 and 7' are supported by the mount 6, 6' in opposition to the light source 3.

A star foil 10 is sandwiched between two glass sheets 8 and 9 subsequent to the condenser lenses 7 and 7', respectively, considered in the direction of light propagation.

The star foils 10 are, for example, foils perforated to simulate a plurality of stars.

It is also feasible to use photoslides instead of said foils. The foils 10 advantageously have the shape of a polyhedron.

The condenser lens mounts 6, 6' are adjustable relative to the mount 4, 4' by means of screws 14, 14'.

The mount 4, 4' of the projectors 1, 1' and the condenser lenses 7 and 7' are of polygonal shape.

The polygonal condenser lenses 7 and 7' have bevel edges 11 and 12 of circumferential faces 13, 13'.

The bevel edges 11 and 12 are opposite to the light source 3. Each edge 11 of the face 13 of the condenser lens 7 is contacting the edge 12 of the face 13' of the condenser lens 7'. The projectors 1 and 1' are in optical alignment with respective radial axes $0-0_1$, $0-0_2$ originating from the light source 3.

FIG. 2 shows a section of the projector 1 arrangement of FIG. 1, however, considered from the light source 3.

The polygons 7 and 7' have contacting edges 11 and 12.

The polygons 7 and 7' correspond in their shape to the respective star foils 10 of FIG. 1.

By virtue of the invention and in particular by the shape of the condenser lenses 7 and 7' the space between the projectors is substantially eliminated and hence brightness losses are eliminated.

In operation the light emitted from the coil 3' of the light source 3 passes the condensers 7 and 7' along the respective optical axes $O-O_1$, $O-O_2$ which are also the optical axes of the projectors 1 and 1' and illuminate the respective star foils 10, which are, in turn, projected to the dome of a not shown planetarium dome.

I claim:

1. A projection device for projecting stars particular for use in planetaria comprising:
   a substantially spherical housing,
   a plurality of holes in said housing,
   a light source being arranged substantially in the center of said spherical housing,
   said light source emitting a plurality of radial beams,
   a plurality of projectors, each of said projectors being located in one of said holes,
   each of said projectors having a mount and a condenser lens and an objective in said mount,
   each of said plurality of projectors having an optical axis coinciding with a respective one of said plurality of radial beams,
   said objective and said condenser lens of said projectors being in optical alignment with a respective one of said optical axes,
   the condenser lenses being arranged in opposition to said light source, and having a polygonal circumferential face each side of said polygonal circumferential face contacting a respective side of neighbouring condenser lens circumferential faces.

2. A projection device as claimed in claim 1, wherein each mount is polygonal in the vicinity of said condenser lenses.

* * * * *